(12) United States Patent
Myers

(10) Patent No.: US 11,747,235 B2
(45) Date of Patent: Sep. 5, 2023

(54) COMPOSITE COMPONENTS USED IN VIBRATION SYSTEMS

(71) Applicant: Harold Myer Myers, Murrieta, CA (US)

(72) Inventor: Harold Myer Myers, Murrieta, CA (US)

( * ) Notice: Subject to any disclaimer, the term of this patent is extended or adjusted under 35 U.S.C. 154(b) by 0 days.

(21) Appl. No.: 18/055,166

(22) Filed: Nov. 14, 2022

(65) Prior Publication Data

US 2023/0152181 A1 May 18, 2023

Related U.S. Application Data

(60) Provisional application No. 63/263,964, filed on Nov. 12, 2021.

(51) Int. Cl.
*G01M 7/02* (2006.01)
*B33Y 80/00* (2015.01)

(52) U.S. Cl.
CPC ............... *G01M 7/02* (2013.01); *B33Y 80/00* (2014.12)

(58) Field of Classification Search
CPC .......... G01M 7/02; G01M 7/027; G01M 7/04; G01M 7/06
See application file for complete search history.

(56) References Cited

U.S. PATENT DOCUMENTS

| | | | |
|---|---|---|---|
| 2,754,679 A | 7/1956 | Petroff | |
| 3,020,751 A | 2/1962 | Wohl | |
| 3,425,266 A | 2/1969 | Klinger et al. | |
| 4,092,869 A * | 6/1978 | Kimball | G01M 7/02 374/57 |
| 4,408,285 A | 10/1983 | Sisson et al. | |
| 4,440,026 A * | 4/1984 | Kimball | B23Q 1/36 403/50 |
| 4,633,716 A * | 1/1987 | Martin | G01M 7/027 73/663 |
| 4,641,050 A * | 2/1987 | Emerson | G01M 7/04 310/27 |
| 5,965,819 A | 10/1999 | Piety et al. | |
| 5,969,256 A | 10/1999 | Hobbs | |
| 6,006,164 A | 12/1999 | McCarty et al. | |
| 6,257,066 B1 | 7/2001 | Chandler et al. | |
| 6,966,235 B1 | 11/2005 | Paton | |
| 7,283,914 B2 | 10/2007 | Poorman et al. | |
| 8,291,767 B2 | 10/2012 | Lee et al. | |

(Continued)

FOREIGN PATENT DOCUMENTS

GB     2211268 A  *  6/1989  ............ G01M 7/027

*Primary Examiner* — Natalie Huls
(74) *Attorney, Agent, or Firm* — Dunlap Bennett & Ludwig, PLLC

(57) ABSTRACT

An electrodynamic vibration test system, also referred to as a shaker apparatus, includes many components but the transmission of vibration to a unit under test is limited to three while testing is performed in the horizontal mode and only two key items in the vertical mode. In the horizontal test mode, the armature is mechanically joined to a driver bar which is also mechanically connected to a slip plate. In the vertical mode the moving parts include a head expander mechanically connected to an armature. With the use of composite materials for the moving elements, total weight is decreased by fifty percent or more resulting in a power usage decrease while simultaneously increasing force capability.

20 Claims, 4 Drawing Sheets

(56) References Cited

U.S. PATENT DOCUMENTS

| | | |
|---|---|---|
| 8,607,636 B2 | 12/2013 | Wu et al. |
| 8,800,374 B2 | 8/2014 | Sonyey et al. |
| 9,435,684 B2 | 9/2016 | Baldwin |
| 10,746,626 B2 | 8/2020 | Williamson et al. |
| 2007/0062293 A1* | 3/2007 | Lund ..................... G01M 7/04 73/663 |
| 2007/0273399 A1 | 11/2007 | Gleason et al. |

* cited by examiner

COMPOSITE COMPONENTS USED IN VIBRATION SYSTEMS

CROSS-REFERENCE TO RELATED APPLICATION

This application claims the benefit of priority of U.S. provisional application No. 63/263,964, filed Nov. 12, 2021, the contents of which are herein incorporated by reference.

BACKGROUND OF THE INVENTION

The present invention relates to vibration shakers and more particularly to composite components in a vibration system.

Vibration shakers are typically comprised of three major moving components: an armature, a driver bar, and a slip plate. The armature coupled to an amplifier and other active components provides a major driving force, and this force is then transmitted to a mechanically connected driver bar between the armature and the slip plate. The force is then transmitted to a test item mounted on the slip plate.

For the past sixty years, these major components have been manufactured using magnesium or aluminum which are very heavy and expensive to produce. In a typical shaker, the three key moving components typically weigh upwards of 150 pounds and in many instances exceed 300 to 400 pounds.

These combined weights of the major moving components require a tremendous amount of energy to move the components within and/or attached to the shaker components during normal testing.

Reducing the weight of these heavy components can save energy. Modified or redesigned components using newer composite materials and advanced manufacturing techniques could realistically result in millions of kilowatts saving per year every year over the 15-to-20-year operating life of most shakers operating in the United States.

The ability to construct lighter-weight shaker components is a sound progressive step towards industrial energy conservation. As can be seen, there is a need for a lightweight shaker and shaker components.

SUMMARY OF THE INVENTION

An electrodynamic vibration test system, also referred to as a shaker apparatus, includes many components but the transmission of vibration to a unit under test is limited to three while testing is performed in the horizontal mode and only two key items in the vertical mode. In the horizontal test mode, the armature is mechanically joined to a driver bar which is also mechanically connected to a slip plate. These three mutually connected items comprise the moving elements which provide the required vibration delivered from the armature to the slip plate and a test item mounted on the slip plate. In the vertical mode the moving parts consist of a head expander mechanically connected to an armature. During either test, the above-mentioned items require large amounts of electrical power to stimulate the total weight of the key items and the test item. The design ownership assumes responsibility for the test item weight while key vibration shaker moving elements weights are controlled by the vibration system manufacturers. With the use of composite materials for the moving elements total weight is decreased in a range of fifty to as much as eighty percent resulting in a power usage decrease while simultaneously increasing force capability.

The use of composite materials consisting of specialized polymers and fillers such as various metals, glass and/or carbon or nylon threads reduces the weights of key components and it is lighter in weight, easier to install or replace, reduces electrical usage, and increases force-pound power. Reducing weight corresponds to a reduction in electrical power usage and reducing cost of operation. The newer composites and advanced fabrication techniques also reduce manufacturing time and cost for OEM manufacturers.

The use of these materials also offers many benefits for both manufacturers of vibration systems and system users who perform the daily testing of America's products. The newer materials and manufacturing technics yield many benefits, including non-obvious ones discovered by the inventor of the present invention. For example, it has been demonstrated in many leading industries that products using composite components in the manufacturing cycle will result in reduced weight of key components and reduced electricity usage. But, in the case of vibration systems, it also increases the force power by upwards of fifty percent beyond long established operating specifications. This benefits the manufacturer, by providing reducing costs because lower force systems can replace higher force systems at a lower cost. As another example, it benefits users by allowing them to replace heavy weight components with more efficient components to lower their electricity costs. There is also the benefit to light components when having to change slip plate from a small size to a larger size because of having to test larger parts. In some cases, the need for an overhead crane or a forklift to move the components is eliminated as one or two people can easily lift most of the more common components manufactured with composite materials.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
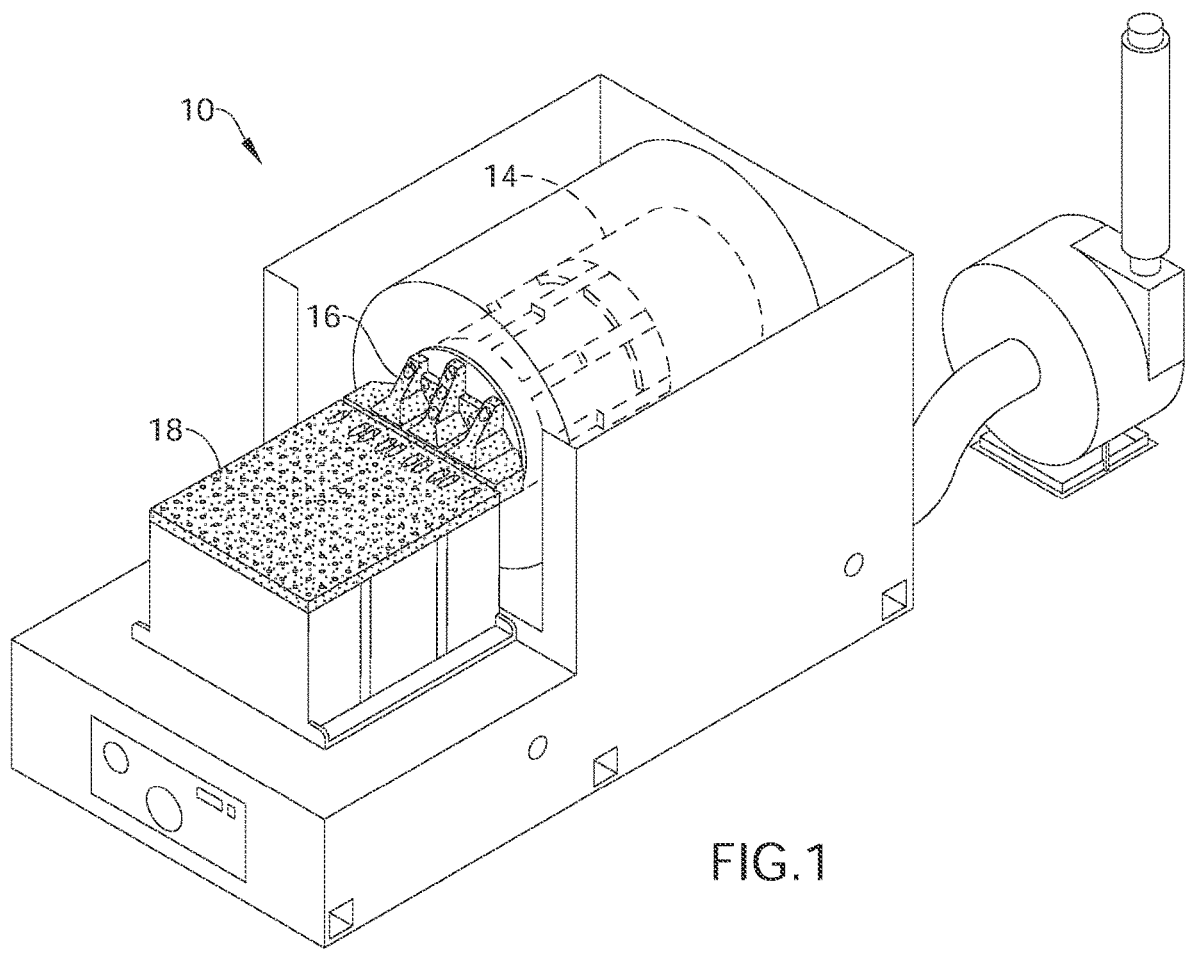
FIG. 1 is a perspective view of an exemplary vibration testing system in a horizontal configuration.

The subject disclosure is described with reference to the drawings, wherein like reference numerals are used to refer to like elements throughout. In the following description, for purposes of explanation, numerous specific details are set forth to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

A general overview of the various features of the invention will be provided, with a detailed description following. Broadly, an embodiment of the present invention provides a vibration shaker incorporating key components manufactured using lightweight composites for greatly reduced energy consumption during operation at an operation range of 2,200 to 60,000 force pounds. The vibration shaker comprises three components: a slip plate, a driver bar, and an armature.

In certain embodiments, the slip plate may be manufactured using a variety of techniques including using jigs and fixtures to marry different composite materials, CNC machining, casting, injection molding, and/or 3D printing using composite singular or combined materials to achieve a solid structural form, providing adequate structural integrity and standard industry specification compliance. The armature frame may be manufactured using similar techniques as the slip plate. The driver bar may also be manufactured using similar techniques as the slip plate.

Figure 2:
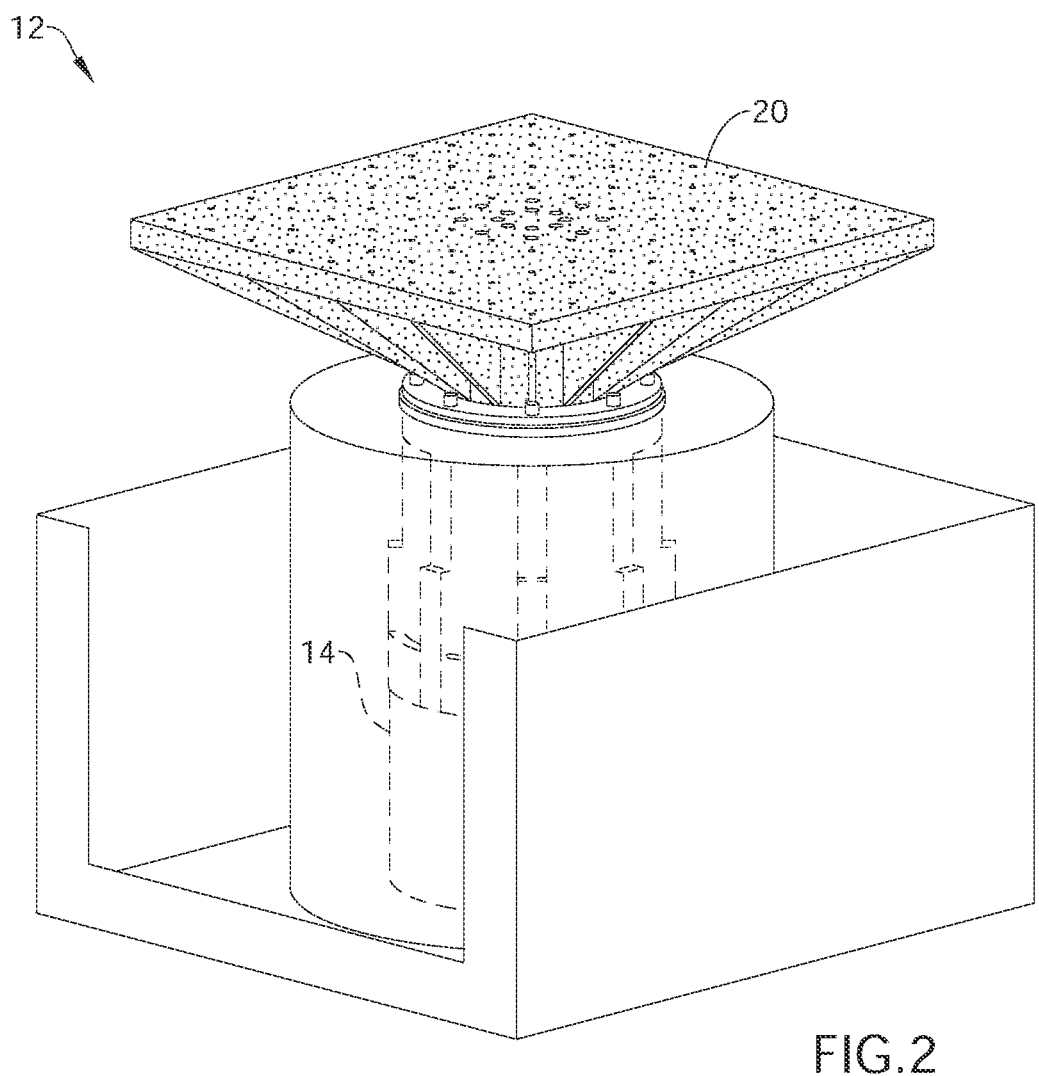
FIG. 2 is a perspective view of an exemplary vibration testing system in a vertical configuration.
Figure 3:
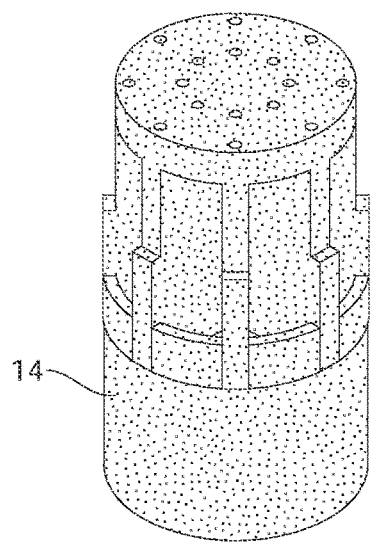
FIG. 3 is a perspective view of an exemplary composite armature.
Figure 4:
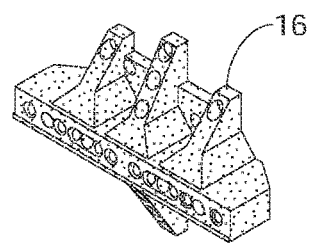
FIG. 4 is a perspective view of an exemplary composite driver bar.
Figure 5:
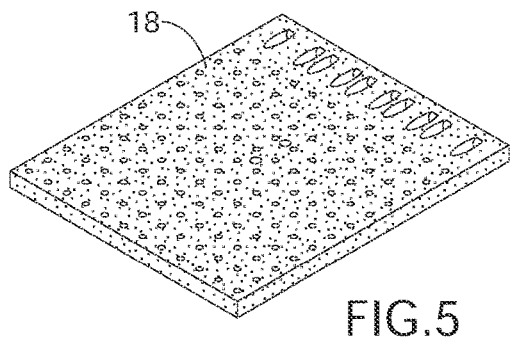
FIG. 5 is a perspective view of an exemplary composite slip plate.
Figure 6:
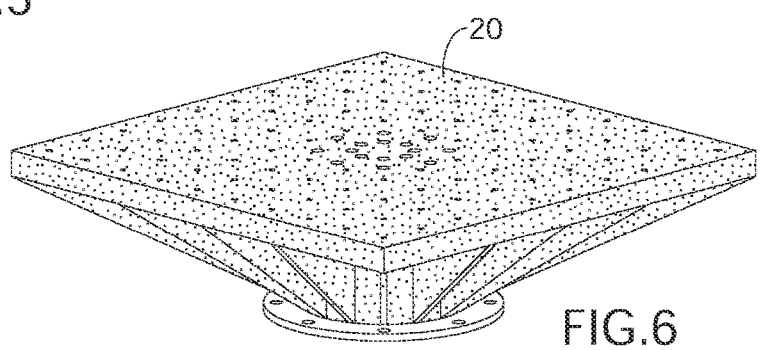
FIG. 6 is a perspective view of an exemplary composite head expander.
Figure 7:
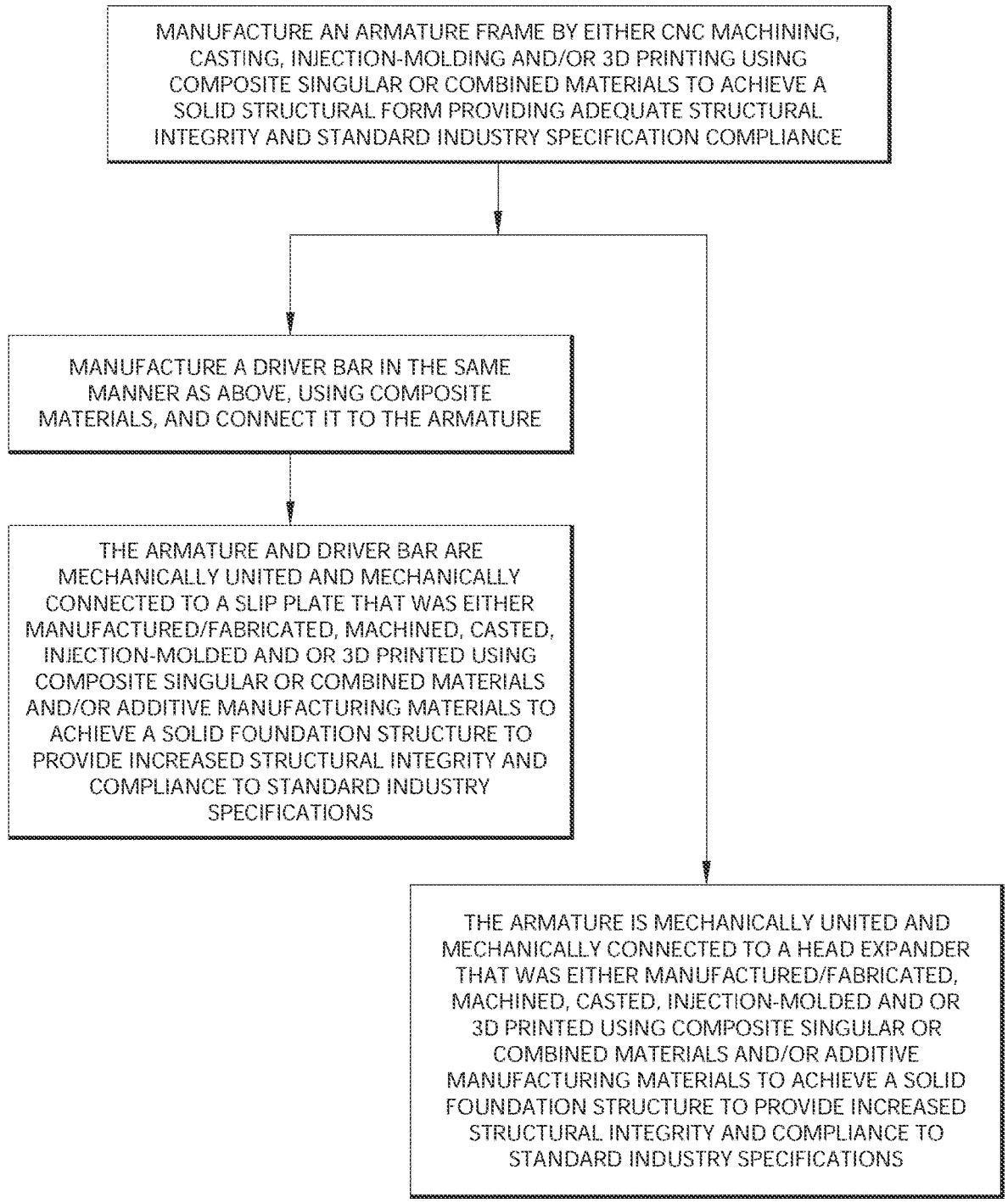
FIG. 7 is a flow chart of the invention.

Referring now to FIGS. 1-7, FIG. 1 is a perspective view of an assembled vibration shaker in a horizontal configuration 10, and FIG. 2 is a perspective view of an assembled vibration shaker in a vertical configuration 12. The vibration shaker comprises an armature 14, a driver bar 16, and a slip plate 18. FIG. 3 is a perspective view of the armature 10. FIG. 4 is a perspective view of the driver bar 16. FIG. 5 is a perspective view of the slip plate 18. In certain embodiments, the slip plate may include three layers: a top layer, a middle layer, and a bottom layer. FIG. 6 is a perspective view of a head expander used in the vertical configuration 12.

The armature 14, driver bar 16, and slip plate 18 are all key components in an electrodynamic shaker apparatus. When all three are manufactured using composite materials, they offer additional benefits to the test operation. For example, and making reference to FIG. 7, manufacturing an armature frame 14 constructed of composite material manufactured/fabricated by either being computer numeric controlled (CNC) machined, casted, injection molded, and or three-dimensional (3D) printing using composite singular or combined materials to achieve a solid structural form provides adequate structural integrity and standard industry specification compliance. Then, when a winding is added, the armature frame 14 is mechanically connected to a driver bar 16 also manufactured using composite materials. The driver bar 16 is lastly mechanically connected to a slip plate 18 also manufactured of composite material. Then, the three key essential items named (armature 14, driver bar 16 and slip plate 18) are mechanically united together in an electrodynamic apparatus to allow testing of consumer, aerospace, automotive, military, or industrial units attached mechanically via inserts on the mounting surface of the slip plate. All three key components function in synchrony while transmitting vibration frequencies ranging from zero to 2000 Hz coupled with a force rating up to 125 G's root mean square (rms) to stimulate the unit under test in the horizontal plane to verify the test unit design validity.

The armature 14 described above may be installed in an electrodynamic shaker in the vertical position 12 and mechanically connected to a head expander 20 either manufactured/fabricated, machined, casted, injection molded and or 3D printing using composite singular or combined materials and/or additive manufacturing materials to achieve a solid foundation structure to provide increased structural integrity and compliance to standard industry specifications. Further, it provides a suitable mounting size on the plate 18 to mechanically attach, using bolts and inserts, consumer, aerospace, automotive, military, or industrial units on the mounting surface of the head expander 20 to validate the design validity of the unit under test during vertical testing with frequencies ranging from zero to 2000 Hz coupled with a force rating up to 125 G's rms.

The slip plate 18 and head expander 20 components previously described above may range in square area size from 12 inches square to 72 inches square on the surface for mounting test items and have a thickness of 0.5 inches, typically up to 3 inches or greater specified in 0.5-inch increments and have from 9 to over 400 mounting holes with installed inserts to accommodate either small test units requiring minimal structural support and large test units requiring greater structural support during testing.

These above-described components 14, 16, 18, 20 can be composed of a variety of combinations of composite plastics, aka polymers and known fillers, where use of certain plastic and filler combinations are selected with known properties to allow these components to successfully meet the demanding requirements of specific applications, thermal settings and including the stringent requirements of industrial, aerospace, automotive, military and government specifications.

The lighter-weight composite components 14, 16, 18, 20 in comparison to current manufacturing of similar components may be manufactured using composite materials as specified in the immediately above paragraph, have demonstrated decreased power usage during test cycles, resulting in lower electrical power costs.

Lighter-weight component composite usage has also demonstrated higher force capability beyond conventional shakers' specified power levels during extensive testing, which will extend the force-pound rating of the shaker apparatus beyond its original design objectives.

As will be appreciated by those with skill in the art, lighter-weight composite components are easier to be interchanged in an industrial setting without the use of a crane, as is typical in non-composite components.

These composite components used in an electrodynamic shaker can also be produced very rapidly in comparison to existing manufacturing techniques utilizing non-composite materials. They also reduce wear-factor on a multitude of synergistic components in the shaker apparatus during ordinary testing and therefore lengthens the period of time required between normal maintenance schedules.

While one or more preferred embodiments are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A vibration shaker comprising:
   an armature frame formed through 3D printing of one or more composite materials;
   a driver bar formed through 3D printing by way of the one or more composite materials; and
   a slip plate formed through 3D printing by way of the one or more composite materials,
   wherein preselection of the one or more composite materials is made from a group of composite materials that, when mechanically connected, the armature frame, the drive bar, and the slip plate function in synchrony while transmitting vibration frequencies ranging from zero to 2000 Hz.

2. The vibration shaker of claim 1, wherein the slip plate has a square area size falling in the range of 12 inches square to 72 inches square, and the slip plate comprises a plurality of mounting holes.

3. The vibration shaker of claim 1, wherein the one or more composite materials comprise a carbon fiber.

4. The vibration shaker of claim 1, wherein the one or more composite materials are adapted to transmit vibration frequencies ranging from zero to 2000 Hz with a force rating up to 125 G's root mean square.

5. A vibration shaker comprising:
   an armature frame composed of carbon fiber composite material; and
   a head expander composed of carbon fiber composite material,
   wherein the carbon fiber composite material is adapted so that, when mechanically connected, the armature frame and the head expander function in synchrony while transmitting vibration frequencies ranging from zero to 2000 Hz.

6. The vibration shaker of claim 5, wherein the head expander has a square area size falling in the range of 12 inches square to 72 inches square and comprises a plurality of mounting holes.

7. The vibration shaker of claim 5, wherein carbon fiber composite material is adapted to transmit vibration frequencies ranging from zero to 2000 Hz with a force rating up to 125 G's.

8. The vibration shaker of claim 5, wherein the armature and the head expander are formed by either CNC machining, casting, injection molding, or 3D printing.

9. The vibration shaker of claim 1, wherein the one or more composite materials comprise a glass threading.

10. The vibration shaker of claim 1, wherein the one or more composite materials comprise a nylon threading.

11. The vibration shaker of claim 1, wherein the one or more composite materials comprise a polymer.

12. A slip plate for a vibration shaker, the slip plate comprising:
    a top layer of one or more composite materials;
    a bottom layer of the one or more composite materials; and
    a middle layer sandwiched between the top and bottom layers.

13. The slip plate of claim 12, wherein the one or more composite materials are adapted to transmit vibration frequencies ranging from zero to 2000 Hz.

14. The slip plate of claim 13, wherein the one or more composite materials are adapted to transmit vibration frequencies ranging from zero to 2000 Hz with a force rating up to 125 G's.

15. The slip plate of claim 14, wherein the top layer and the bottom layer are formed through 3D printing.

16. The slip plate of claim 15, wherein the one or more composite material includes nylon threading.

17. The slip plate of claim 15, wherein the one or more composite material includes glass threading.

18. The slip plate of claim 15, wherein the one or more composite material includes carbon threading.

19. The slip plate of claim 14, wherein each layer is formed by CNC machining, casting, or injection molding.

20. The slip plate of claim 15, wherein each layer comprises a plurality of mounting holes.

* * * * *